United States Patent
Wonderlich

(10) Patent No.: US 9,633,491 B2
(45) Date of Patent: Apr. 25, 2017

(54) MONITORING BELT OPERATION TO PREDICT BELT LIFESPAN

(71) Applicant: DEERE & COMPANY, Moline, IL (US)

(72) Inventor: Grant J. Wonderlich, Milan, IL (US)

(73) Assignee: Deere & Company, Moline, IL (US)

(*) Notice: Subject to any disclaimer, the term of this patent is extended or adjusted under 35 U.S.C. 154(b) by 86 days.

(21) Appl. No.: 14/805,998

(22) Filed: Jul. 22, 2015

(65) Prior Publication Data
US 2017/0024939 A1    Jan. 26, 2017

(51) Int. Cl.
*G07C 5/08* (2006.01)
*A01C 7/16* (2006.01)

(52) U.S. Cl.
CPC .............. *G07C 5/0808* (2013.01); *A01C 7/16* (2013.01)

(58) Field of Classification Search
CPC ................................ G07C 5/0808; A01C 7/16
See application file for complete search history.

(56) References Cited

U.S. PATENT DOCUMENTS

| | | | |
|---|---|---|---|
| 6,681,706 B2 | 1/2004 | Sauder et al. | |
| 2008/0133051 A1 | 6/2008 | Wallace et al. | |
| 2009/0198403 A1* | 8/2009 | Yurgil | F02B 77/081 701/33.7 |
| 2014/0230705 A1 | 8/2014 | Radtke et al. | |
| 2016/0076442 A1* | 3/2016 | Spohn | F02B 77/081 701/29.4 |

FOREIGN PATENT DOCUMENTS

EP    1273899 A2    1/2003

OTHER PUBLICATIONS

European Search Report for Application No. EP 16179301, Computer-Implemented Method and System for Monitoring a Belt Driven by a Motor, Dec. 21, 2016.

* cited by examiner

*Primary Examiner* — Anne M Antonucci
(74) *Attorney, Agent, or Firm* — Lorenz & Kopf, LLP

(57) ABSTRACT

A system and a method for monitoring a belt to predict a lifespan for the belt are described. An indicator of belt speed and an indicator of torque from a motor for driving the belt can be determined for a first time interval. A belt service value can be determined for the first time interval based upon the indicators of belt speed and torque from the motor. The belt service value can indicate a deviation from one or more reference belt speeds and torques from the motor. An effective service interval can be determined for the operation of the belt during the first time interval, based upon the belt service value. An indicator of a remaining operational lifespan for the belt can then be determined, based upon the effective service interval.

20 Claims, 4 Drawing Sheets

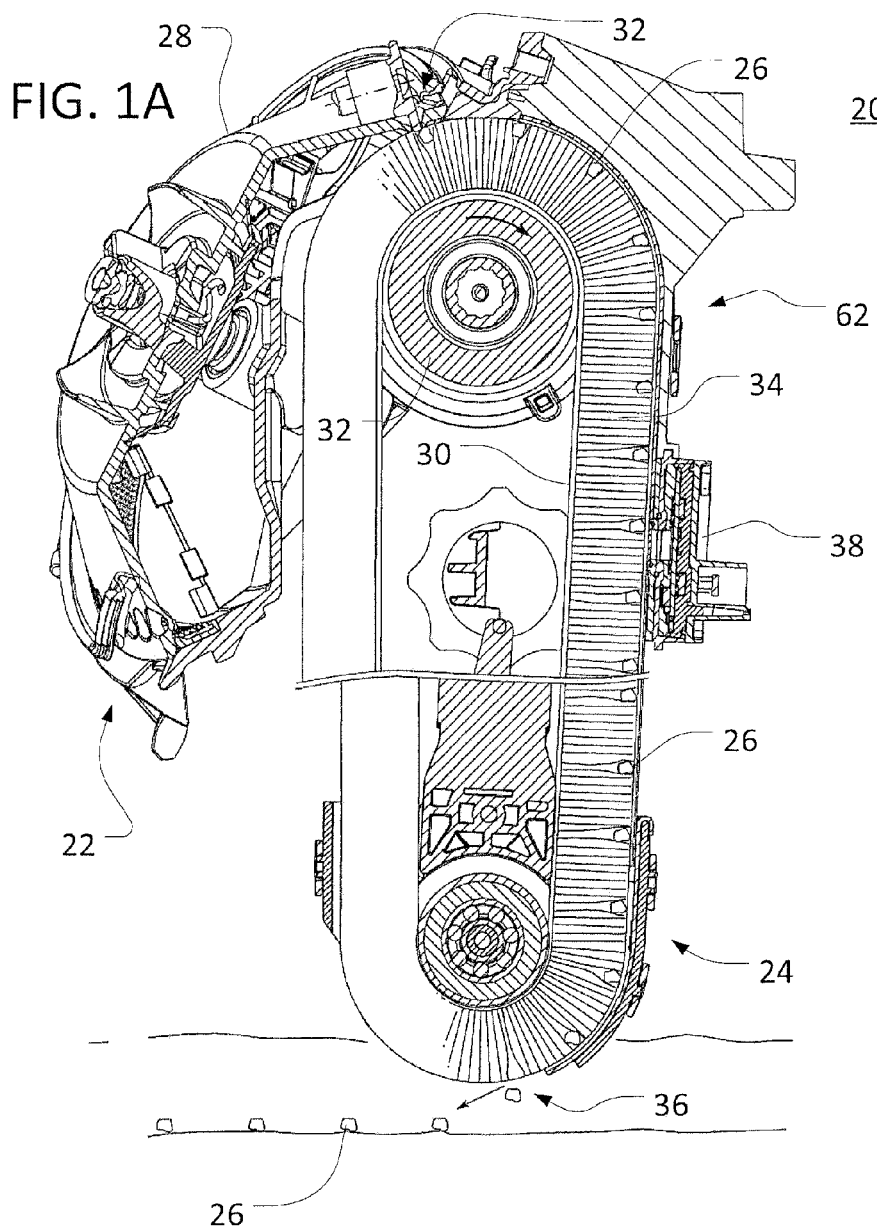
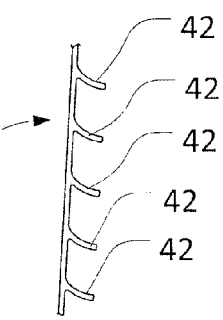

MONITORING BELT OPERATION TO PREDICT BELT LIFESPAN

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to monitoring belts, including belts for seeding machines, in order to predict operational lifespans of the belts.

BACKGROUND OF THE DISCLOSURE

In various applications, belts can be used to transmit power between components. Belts can also be used to transport objects or materials. For example, belts in seeding machines can be used to transport seeds between different locations, including to distribute seeds from a seed reservoir to locations along a field.

During use, belts typically undergo wear, which can reduce the operational lifespans of the belts. Because replacing a belt can be time-consuming, it may be useful to provide a system for predicting a belt's lifespan, such that replacement (or other maintenance) can be planned in advance. Advance prediction of the end of a belt's lifespan may also help users to avoid complete failure (e.g., breakage) of a belt, and the associated downtime and repair costs.

SUMMARY OF THE DISCLOSURE

A system and a method for monitoring belts are disclosed.

According to one aspect of the disclosure, a computer-implemented method can be used to monitor a belt driven by a motor in order to predict an operational lifespan for the belt. An indicator of belt speed and an indicator of torque from the motor can be determined for a first time interval. A belt service value can be determined for the first time interval based upon the indicators of belt speed and torque from the motor. The belt service value can indicate a deviation from one or more reference belt speeds and torques from the motor. An effective service interval can be determined for the operation of the belt during the first time interval, based upon the belt service value. An indicator of a remaining operational lifespan for the belt can then be determined, based upon the effective service interval.

According to another aspect of the disclosure, a system can be used for monitoring a belt driven by a motor to predict an operational lifespan for the belt. Sensors can be configured to detect, for a first time interval, an indicator of torque from the motor and an indicator of belt speed. A controller can be configured to determine a belt service value based upon the indicators of belt speed and torque from the motor. The belt service value indicates a deviation from one or more reference belt speeds and torques from the motor. The controller can also be configured to determine an effective service interval for the operation of the belt during the first time interval, based upon the belt service value. The controller can further be configured to determine an indicator of a remaining operational lifespan for the belt, based upon the effective service interval.

According to still another aspect of the disclosure, a monitoring system can be used with a seeding machine that is configured to move seeds with a seed belt driven by a belt motor. A first sensor can be configured determine an indicator of belt speed for a first time interval. A second sensor can be configured to determine an indicator of torque from the belt motor for the first time interval. A controller can be configured to compare the indicators of belt speed and torque from the belt motor to corresponding reference indicators. The controller can also be configured to determine a belt service value based upon a deviation from the reference indicators of the indicators of belt speed and torque from the belt motor. The controller can also be configured to determine an effective service interval for the operation of the belt during the first time interval, based upon multiplying the belt service value by the first time interval. The controller can further be configured to determine an indicator of a remaining operational lifespan for the belt based upon adding the effective service interval to a cumulative service counter or subtracting the effective service interval from a remaining service counter.

The details of one or more embodiments are set forth in the accompanying drawings and the description below. Other features and advantages will become apparent from the description, the drawings, and the claims.

BRIEF DESCRIPTION OF THE DRAWINGS

FIG. 1A is a cross-sectional view of an example seeding machine with a brush belt;

FIG. 1B is a side schematic view of a portion of a flighted belt for use with the seeding machine of FIG. 1A;

Like reference symbols in the various drawings indicate like elements.

DETAILED DESCRIPTION

Figure 2:
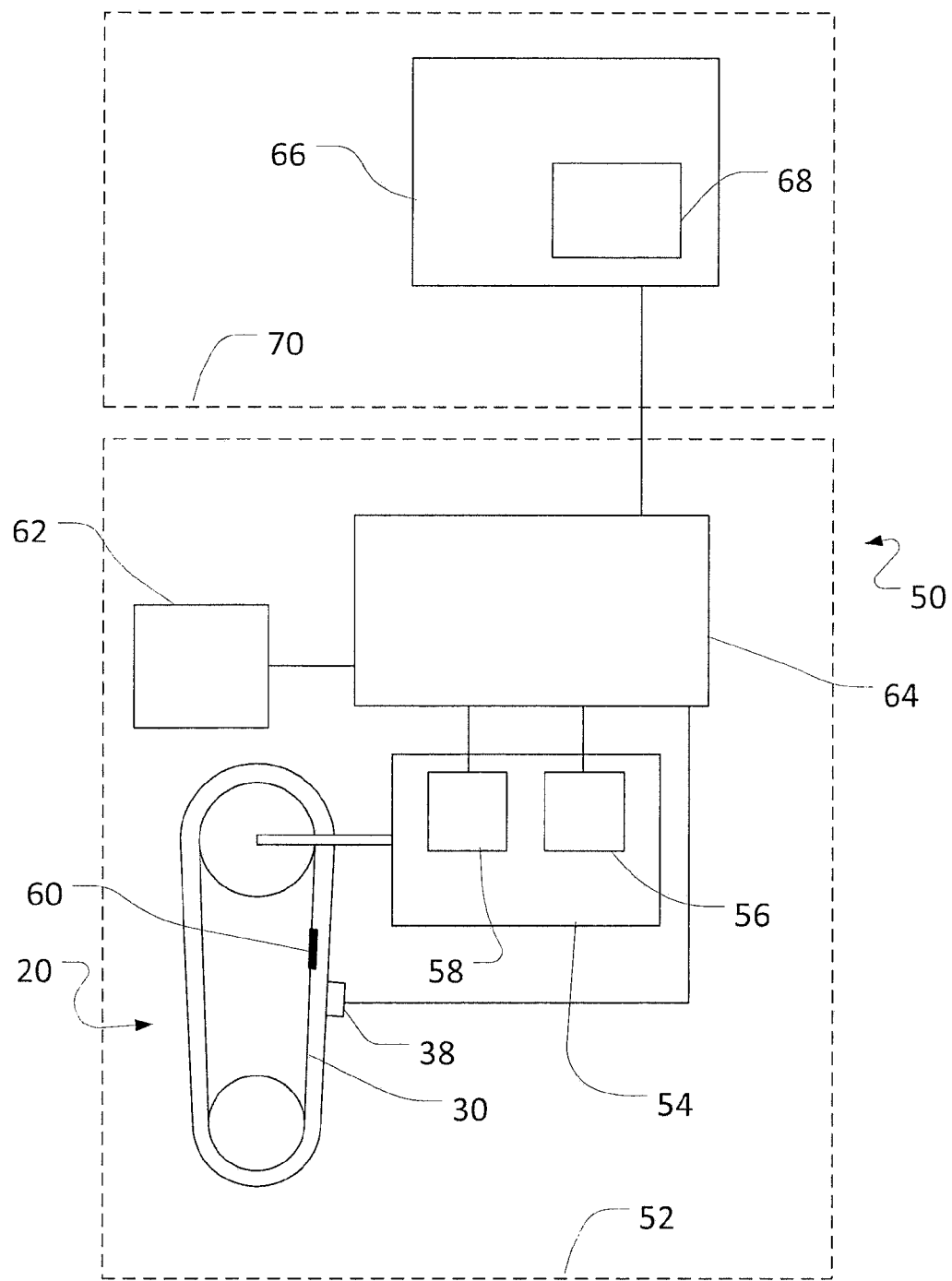
FIG. 2 is a schematic view of a monitoring system for a belt used with the seeding machine of FIG. 1A.

The following describes one or more example embodiments of the disclosed system and method, as shown in the accompanying figures of the drawings described briefly above. Various modifications to the example embodiments may be contemplated by one of skill in the art.

As used herein, unless otherwise limited or modified, lists with elements separated by "and" that are preceded by the phrase "one or more of" or "at least one of" indicate configurations or arrangements that potentially include individual elements of the list, or any combination thereof. For example, "at least one of A, B, and C" or "one or more of A, B, and C" can indicate only A, only B, only C, or any combination of two or more of A, B, and C (e.g., A and B; B and C; A and C; or A, B, and C).

As also noted above, it may be useful to monitor operation of a belt (e.g., a seed-transporting belt for a seeding machine), in order to predict an operational lifespan for the belt. As described herein, such monitoring and prediction can be achieved based upon determining indicators of speed and torque for a belt (e.g., as measured with regard to a related motor), or other indicators. In some embodiments, determined speed and torque indicators (or others) can then be used to determine an effective service interval for the belt. Generally, the effective service interval can represent an effective amount of time that the belt has been operating, taking into account the type of operations (e.g., operations under high or low loads, or with high or low speeds) that the belt has performed over the interval. For example, for a given actual time interval of operation, a higher or lower effective service interval can be determined, depending on whether the operation was at higher or lower torques or speeds. Using the effective service interval, a remaining operational lifespan of the belt can then be predicted, such that an operator can be informed of the predicted need for maintenance before (or after) the nominal operational lifespan of the belt.

As will become apparent from the discussion herein, the disclosed monitoring system and method for belts can be used advantageously to this end, in a variety of settings and with a variety of machinery. In certain embodiments, referring now to FIG. 1A, the disclosed system and method can be implemented with regard to a seeding machine 20. In some embodiments, the seeding machine 20 can be included in a row unit, which can be towed by an agricultural vehicle such as a tractor (not shown in FIG. 1A). It will be understood that the disclosed system and method can be used with other configurations of the seeding machine 20, as well as with various other types of devices. For example, the disclosed system and method can be used to monitor belts in other agricultural machines, such as agricultural combines or balers, or belts in other work vehicles.

As depicted in FIG. 1A, the seeding machine 20 includes a seed meter 22 and a seed delivery system 24, which can collectively move various seeds 26 from a seed reservoir (not shown) to planting locations in a field. Rotational power from one or more motors (not shown in FIG. 1A) can be used to rotate a seed disc 28 of the seed meter 22 and to move a brush belt 30 of the seed delivery system 24 (via rotation of a powered sheave 32). As the seed disc 28 rotates, the seed disc 28 can carry seeds from the reservoir to a transition point 44, where bristles 34 on the brush belt 30 capture the seeds for transport to an ejection point 36. A seed sensor 38 (e.g., an optical sensor) can be included in the seed delivery system 24, such that presence (or absence) of seeds at particular locations along the belt 30 can be detected.

In some embodiments, a different type of belt can be used in the seeding machine 20. For example, referring also to FIG. 2A, a belt 40 with various flights 42 for transporting seeds can be used to move seeds between locations within a seeding machine (e.g., a machine similar to the seeding machine 20).

As noted above, belts for other types of systems can also be monitored by the disclosed system (and method). For example, belts for agricultural combines or balers can be monitored, including via monitoring that is generally similar to that described herein with respect to the belt 30. As such, other systems monitored as disclosed herein can include various features that are similar to certain features of the seeding machine 20, and which can be monitored and controlled similarly to the corresponding features of the seeding machine 20. For example, other monitored systems can include motors to drive belts of different types, sensors configured to detect passage of a belt or an object or feature carried by a belt, and so on.

FIG. 2 schematically illustrates aspects of a system 50 for monitoring the belt 30 (or other belts). It will be understood, as noted above, that other monitoring (and monitored) systems within the scope of this disclosure can differ from the monitoring system 50 in various ways.

As depicted, the seed delivery system 24 (and the seeding machine 20 generally) can be mounted on a row unit 52. A motor 54 (e.g., an electrical motor) mounted on or near the row unit 52 can be configured to drive rotation of the belt 30. The motor 54 can include (or be in communication with) various sensors, such as a speed sensor 56 and a load sensor 58. The speed sensor 56 can be configured, for example, as an encoder arranged to track relevant revolutions of a shaft, gear, or other rotating body associated with the motor 54 and the belt 30. The load sensor 58 can be configured, for example, as a current sensor, arranged to detect the current load at the motor 54, as an indicator of torque output by the motor 54.

In some embodiments, the speed sensor 56 can be replaced by (or supplemented with) other sensors. For example, the seed sensor 38 of the seed delivery system 24 can be configured to determine indicators of the speed of the belt 30 by detecting movement of the seeds 26 (see FIG. 1A) through the seed delivery system 24. Detected movement of the seeds 26 can be combined, for example, with data regarding the rate of travel of the row unit 52 over a field, speed data from a motor 62 for driving the seed meter 22 (see FIG. 1A), or other data, in order to determine an approximate value for the speed of the belt 30. In some embodiments, data from the seed sensor 38 can be used to verify (and adjust, as appropriate) indicators of belt speed that are determined by the speed sensor 56.

As another example, the seed sensor 38 can be configured to determine indicators of the speed of the belt 30 by detecting the passage of a reference feature 60 (e.g., rather than passage of one or more seeds). With the seed sensor 38 configured as an optical sensor, for example, an approximate speed value for the belt 30 can be determined based upon the seed sensor 38 detecting the passage of a marked (e.g., darkly shaded or colored) region on the belt 30. In this regard, the time interval between passage of the reference feature 60 can then be scaled (or otherwise manipulated) to indicate the speed of the belt 30 (e.g., in revolutions per minute ("RPM")).

As depicted, a controller 64 is also included on the row unit 52. The controller 64 can include one or more computing devices including various processor devices and various associated memory architectures. In certain embodiments, the controller 64 can additionally (or alternatively) include various other electronic control circuits and devices (e.g., various power electronics devices or programmable circuits).

In certain embodiments, the controller 64 can be in communication with various switches, controls and other interfaces or input devices, such as a user interface 66 (including a display screen 68) of a tractor 70 configured to tow the row unit 52. The controller 64 can also be in communication with various sensors, actuators, or other devices distributed on the row unit 52, the tractor 70, or elsewhere. For example, the controller 64 can be in communication with the speed sensor 56 and the load sensor 58 of the motor 54, with other devices of the motor 54 (e.g., general motor control devices), with the seed meter motor 62, and so on.

In some embodiments, the controller 64 can be configured to implement a belt monitoring method in addition to other operations such as control of the motors 54 and 62, communication with the seed sensor 38, communication with remote equipment (e.g., remote seed reservoirs or delivery devices) and so on. In some embodiments, the controller 64 can be remotely located from the row unit 52. In some embodiments, the controller 64 can be configured to control operations for multiple row units (not shown) or other devices.

In some embodiments, the controller 64 can be configured to implement monitoring of the belt 30 during operation, along with prediction of a remaining operational lifespan of the belt 30. For example, the controller 64 can be configured to implement a belt lifespan prediction ("BLP") method.

A BLP method can be represented as various instruction sets and subroutines stored on a storage device forming part of (or otherwise coupled to) the controller 64, and can be executed by one or more processors and one or more memory architectures (e.g., as included in or associated with the controller 64). In certain implementations, the BLP method can be a stand-alone method. In certain implementations, the BLP method can operate as part of, or in conjunction with, one or more other methods or processes and/or can include one or more other methods or processes. Likewise, in certain implementations, the BLP method can be represented and implemented by an entirely hardware-based configuration, in addition (or as an alternative) to a configuration having the BLP method as a set of instructions stored in a storage device (e.g., a storage device included in or associated with the controller 64).

Figure 3:
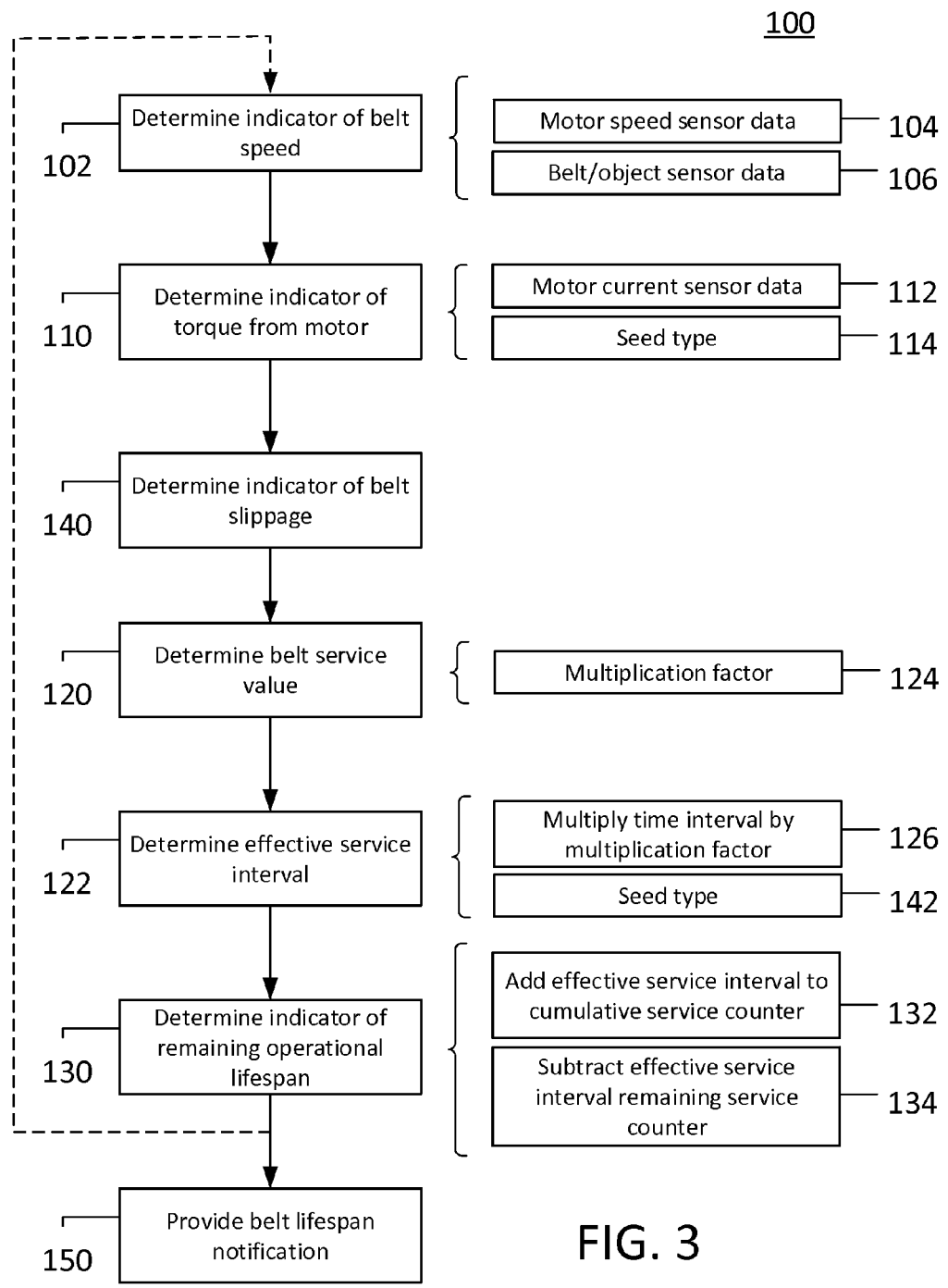
FIG. 3 is a diagrammatic view of an example method for predicting belt lifespan, as can be implemented with the monitoring system of FIG. 2.

FIG. 3 illustrates an example BLP method 100, which can be used to monitor operations and predict lifespan for the belt 30. Variations to the BLP method 100, including variations for use with belts other than belts for seeding machines, will be apparent to those of skill in the art.

As illustrated, the BLP method 100 can generally include determining 102 an indicator of belt speed for the belt 30 over a first time interval (e.g., a relevant cycle or sampling time for the controller 64). Generally, an indicator of belt speed (or other factor) can be a direct value of belt speed (or other factor), or can be a signal or value corresponding to belt speed (or other factor).

In some implementations, an indicator of belt speed can be determined 102 based upon data directly representing an instantaneous or average speed of the belt 30. For example, an indicator of belt speed can be determined 102 based upon data 104 from the speed sensor 56. In this regard, the speed sensor 56 can be used to determine a rotational speed of a drive shaft for transmitting rotational power from the motor 54 to the belt 30, and the speed of the belt 30 can then be determined 102 accordingly (e.g., accounting for any speed changes between the drive shaft and the belt 30).

In some implementations, an indicator of belt speed can be determined 102 based upon data 106 from the seed sensor 38. For example, the seed sensor 38 can be used to detect the speed with which one or more of the seeds 26 (see FIG. 1A) or the reference feature 60 (see FIG. 2) is moving (e.g., by dividing the length of the feature 60 by the amount of time required for the feature 60 to pass the sensor 38). The speed of the belt 30 can then be determined 102 accordingly. In some implementations, an indicator of belt speed can be determined 102 based upon other data.

The BLP method 100 can also include determining 110 an indicator of torque for the motor 54. Determining 110 an indicator of torque can be determined simultaneously with the determining 102 of the indicator of belt speed (e.g., during and for the same time interval) or can be determined 110 before or after the indicator of belt speed is determined 102.

In some implementations, an indicator of torque output can be determined 110 based upon data directly representing an instantaneous or average torque applied to (or via) the belt 30 by the motor 54. In some implementations, the determined 110 indicator of torque for the motor 54 can include an indicator of a fractional portion of the total torque output for the motor 54. For example, where the motor is used to drive multiple systems, including the belt 30, the relevant determined 110 indicator of torque from the motor can be an indicator only of the portion of torque output from the motor that is directed to the belt 30 (i.e., rather than to other systems).

In some implementations, the indicator of torque from the motor can be determined 110 based on direct torque measurements. For example, torque sensors (not shown) can be arranged in place of the current-oriented load sensors 58 to determine 110 the output torque of the motor 54, as directed to the belt 30.

In some implementations, an indicator of torque from the motor can be determined 110 somewhat indirectly. For example, data 112 from the load sensors 58 indicating electrical current load on the motor 54 can be processed to determine 110 a corresponding torque on the motor 54. As another example, an indicator of torque from the motor can be determined 110 (at least partly) based upon a particular seed type 114 that is currently being processed by the seeding machine 20. For example, size, shape, seeding rate, or other characteristics of a particular seed type 114 can correlate, at least partly, with required torque at the belt 30.

Based upon the determined 102, 110 indicators of belt speed and torque from the motor, a belt service value can then be determined 120. Generally, a belt service value can indicate a deviation of the operation of a belt from a nominal or expected operation, over a particular interval. With respect to the determined 102, 110 belt speed and torque from the motor, for example, a determined 120 belt service value can indicate a deviation from an expected (e.g., rated, optimal, or otherwise specified) speed and torque load on the belt 30. Based upon this determined 120 deviation, an adjustment can then be made to an expected lifespan of the belt 30, to account for the enhanced or reduced load imposed by the actual operation of the belt 30. For example, if the determined 120 belt service value indicates more intensive operation of the belt 30 for a particular interval (e.g., a faster or higher torque operation compared to a reference operation), the determined 120 belt service value can correspond to an adjustment that shortens the expected operational lifespan of the belt 30. In contrast, if the determined 120 belt service value indicates a less intensive operation for a particular interval (e.g., a slower or lower torque operation compared to a reference operation), the determined 120 belt service value can correspond to an adjustment that extends the expected operational lifespan of the belt 30.

In some implementations, in order to adjust the expected lifespan of the belt 30, an effective service interval can be determined 122 based upon the determined 120 belt service value. Generally, an effective service interval can represent, for a particular interval of belt operation, an effective interval of operation for the belt during a reference operation (e.g., as opposed to the actual interval, had the belt been operated at a reference speed, torque, and so on). Accordingly, for an actual time interval over which belt speed and torque indicators have been determined 102, 110 to exceed reference speed or torque indicators, a corresponding effective service interval may be determined 122 to be shorter than the actual interval. In contrast, for an actual time interval over which belt speed or torque indicators have been determined 102, 110 as falling below reference speed and torque indicators, a corresponding effective service interval may be determined 122 to be longer than the actual interval.

For actual time intervals over which one of the determined 102, 110 speed and torque indicators exceeds a reference value, and one of the determined 102, 110 speed and torque indicators falls below a reference value, the effective service interval can be determined 122 to be longer or shorter than the actual interval, as appropriate.

In some implementations, an effective service interval can be determined 122 based upon a belt service value that has been determined 120 as a multiplication factor 124. For example, a table, correlation, or model may be determined to relate a particular interval of belt operation at a particular speed and torque to an equivalent interval of belt operation at a reference speed and torque. The ratios of these various intervals can be viewed as multiplication factors 124 for the corresponding actual time intervals. Accordingly, an effective service interval for an actual operating interval at a particular torque and speed can be determined 122 by multiplying 126 the particular actual operating interval by the relevant multiplication factor 124.

Based upon the determined 122 effective service interval, an indicator of a remaining operational lifespan for the belt can then be determined 130. In some implementations, the controller 64 can store a cumulative service counter indicating the total effective operating time for the belt 30. Each successive determined 122 effective service interval for the belt 30 can then be added 132 to the cumulative service counter, with a sufficiently larger number for the cumulative service counter (e.g., a number approaching a maximum cumulative service time) indicating an increased likelihood of belt failure and a corresponding need for belt maintenance. In other implementations, the controller 64 can instead store a remaining service counter indicating the total expected remaining operating time for the expected lifespan of the belt 30. Each successive determined 122 effective service interval for the belt 30 can then be subtracted 134 from the remaining service counter, with the approach of the remaining service counter to a lower band or bound (e.g., zero) indicating an increased likelihood of belt failure and corresponding need for belt maintenance.

In some implementations, other factors can be used to determined 120 belt service values or to determine 122 effective service intervals. For example, it may be useful to determine 140 an indicator of slippage for the belt 30, in order to adjust the determined 102, 110 indicators of belt speed or torque. If the belt 30 is determined 140 to be slipping significantly, the slip velocity of the belt 30 can be used to adjust the determined 102 indicator of belt speed, such that the actual speed of the belt 30 (e.g., rather than the faster output speed of the motor 54) can be used to determined 120 an appropriate belt service value.

Belt slippage can be determined 140 in various ways. In some implementations, for example, data 106 from the seed sensor 38 can be used to determine 140 a difference between an output speed of the motor 54 (e.g., as indicated by the sensor 56) and the actual speed of the belt 30, which may indicate slippage of the belt 30 and the need to adjust the initially-determined 102 belt speed indicators.

As another example, an effective service interval for a particular operating interval can be determined 122 based upon seed type 142. For example, size, shape, seeding rate, or other characteristics of a particular seed type 142 can correlate, at least partly, with an appropriate adjustment to the initially-determined 122 effective service interval (e.g., with larger or harder seed types 142 correlating with large effective service intervals for a particular speed and torque).

In some implementations, the BLP method 100 (or aspects thereof) can be executed interatively, such that a predicted remaining (or cumulative) operational lifespan for the relevant belt can be updated throughout operation of the belt. For example, after an indicator of remaining operational lifespan is determined 130 following a first operating interval, the method 100 can include determining 102 an indicator of belt speed, determining 110 an indicator of torque from the motor, and so on, for a second (e.g., subsequent) operating interval.

Based upon the determined 130 indicator of remaining operational lifespan, a belt lifespan notification can then be provided 150. For example, a bar graph, text notification, or other notification can be provided 150 on the display screen 68 of the input interface 66 of the tractor 70, such that an operator of the tractor 70 can easily see whether the belt 30 (or other belts) may be reaching the end of its effective (i.e., adjusted) expected lifespan. A belt lifespan notification can be provided 150 in various formats, including formats showing expected time remaining in a belt lifespan, expected miles of travel or acreage of coverage (e.g., based upon current speeds of a relevant vehicle), and so on.

In some implementations, a belt lifespan notification can be provided 150 continuously or based upon user commands (e.g., user inputs requesting the display of belt lifespan notifications). In some implementations, a belt lifespan notification can be provided 150 automatically upon the occurrence of a triggering event. For example, a belt lifespan notification may be automatically provided 150 for the belt 30 when the belt 30 reaches a triggering percentage of its total expected lifespan, or is within a triggering number of hours or a triggering distance of travel (and so on) of an expected failure.

Figure 4:
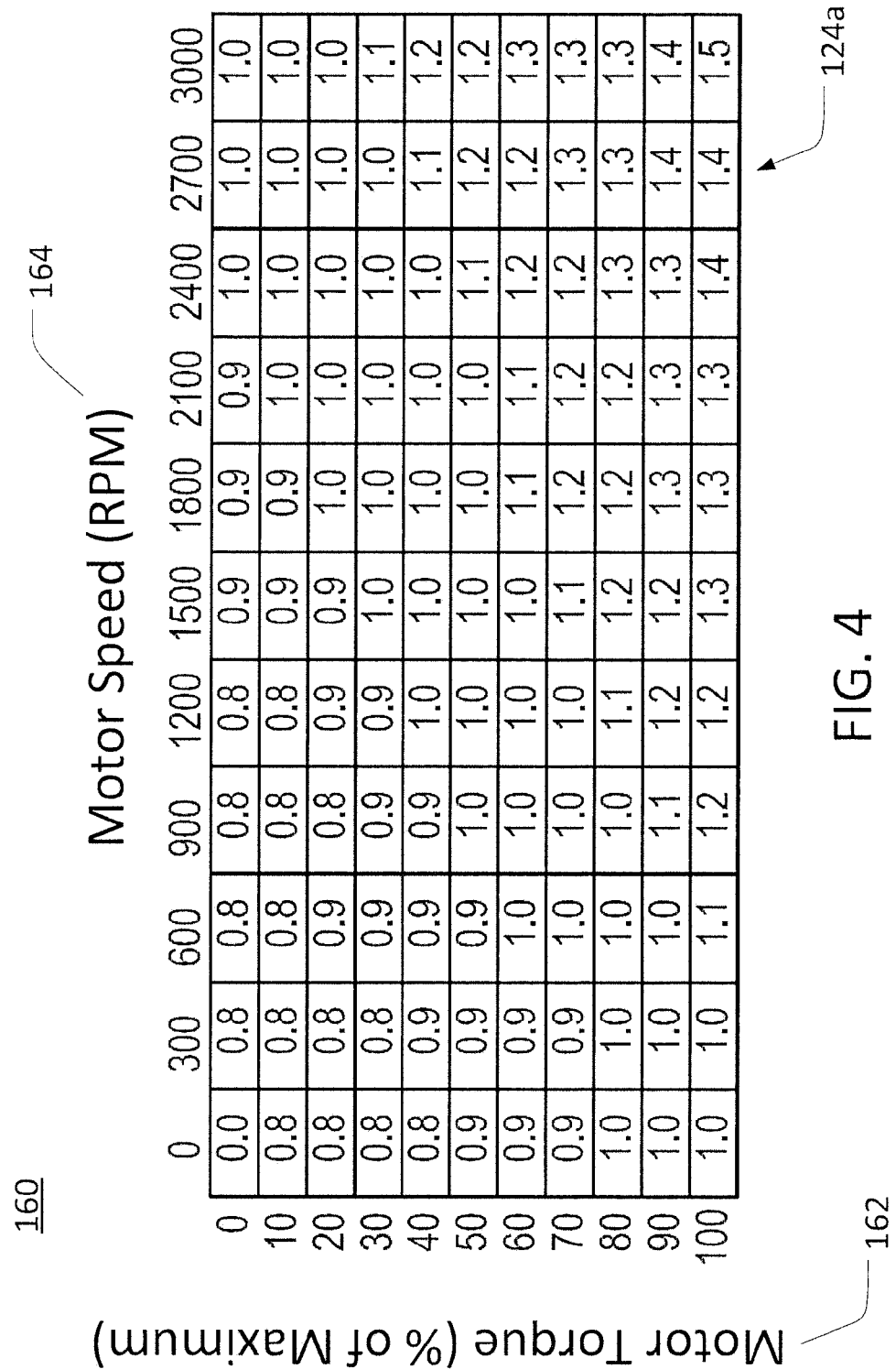
FIG. 4 is an example table of multiplication factors for use with the method of FIG. 3.

As noted above, determining 120 a belt service value can include determining 120 a corresponding multiplication factor 124. FIG. 4 illustrates an example table 160 of example multiplication factors 124*a* (see FIG. 3), corresponding to particular pairings of motor torque 162 (expressed as a percentage of maximum torque) and motor speed 164 (as a proxy for belt speed). The table 160 represents motor speeds 164 ranging from 0 to 3000 RPM and motor torques 162 ranging from 0% to 100% of a maximum torque value. In other implementations, other ranges (or parameters) can be used.

For a system represented by the table 160 (e.g., the belt 30 and motor 54 of the seeding machine 20), speed and torque combinations close to a nominal reference value can correspond to multiplication factors 124*a* that are equal to 1. For example, with the motor 54 operating at 1500 RPM and at 50% of maximum torque, a corresponding multiplication factor 124*a* can be determined 120 (from interrogation of the table 160) to be equal to 1. Accordingly, the effective service interval for operation at these settings can be determined 122 to be equal to the actual time interval over which the operation at those settings occurred.

In contrast, as speed and torque combinations deviate from the nominal reference value, the corresponding multiplication factors 124*a* can deviate from 1. For example, with the motor 54 operating at 2700 RPM and at 90% of maximum torque, a corresponding multiplication factor 124*a* can be determined 120 (from interrogation of the table 160) to be equal to 1.4. Accordingly, the effective service interval for operation at these settings can be determined 122 to be equal to the actual time interval over which the operation at those settings occurred multiplied by 1.4. Similarly, with the motor 54 operating at 300 RPM and at 30% of maximum torque, a corresponding multiplication factor 124*a* can be determined 120 (from interrogation of the table 160) to be equal to 0.8. Accordingly, the effective service interval for operation at these settings can be determined 122 to be equal to the actual time interval over which the operation at those settings occurred multiplied by 0.8.

As noted above, other factors such as seed type or indicators of belt slippage, can also (or alternatively) be used to determine 122, 130 an effective service interval or indicator of remaining belt lifespan. In some implementations, seed type or indicators of belt slippage (or other factors) can be used to modify a table similar to the table 160 (not shown) or a similar correlation or model, such that the table (or correlation or model) includes multiplication factors that appropriately account for the seed type or belt slippage. For example, where a determined 140 indicator of belt slippage suggests that the belt is traveling at a reduced speed relative to the motor speed, the relevant table can be adjusted to reflect the actual belt speed (based upon the determined 140 indicator of belt slippage) rather than the higher motor speed. Alternatively, multiplication factors of the relevant table can be adjusted to reflect the potentially increased wear on a belt in high-slip operation.

In some implementations, seed type or indicators of belt slippage can be used as a third (or fourth, and so on) variable for the table, such that an appropriate multiplication factor can be determined 122 based one three (or more) variables, rather than just two (e.g., motor speed 164 and motor torque 162, as in the table 160).

As will be appreciated by one skilled in the art, certain aspects of the disclosed subject matter can be embodied as a method, system (e.g., a work vehicle control system included in the vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A computer-implemented method for monitoring a belt driven by a motor, in order to predict an operational lifespan for the belt, the method comprising:
   determining, via a first sensor, an indicator of belt speed for a first time interval;
   determining, via a second sensor, an indicator of torque from the motor for the first time interval;
   determining a belt service value for the first time interval based upon the indicators of belt speed and torque from the motor, the belt service value indicating a deviation from one or more reference belt speeds and torques from the motor;
   determining an effective service interval for the operation of the belt during the first time interval, based upon the belt service value; and
   determining an indicator of a remaining operational lifespan for the belt, based upon the effective service interval.

2. The method of claim 1, wherein the belt service value includes a multiplication factor determined based upon the indicators of belt speed and torque from the motor; and
   wherein the effective service interval is determined based upon multiplying the first time interval by the multiplication factor.

3. The method of claim 2, wherein the indicator of the remaining lifespan for the belt is determined based upon one of adding the effective service interval to a cumulative service counter and subtracting the effective service interval from a remaining service counter, the cumulative service counter indicating an effective cumulative operating time for the belt and the remaining service counter indicating an effective remaining operating time in the operational lifespan of the belt.

4. The method of claim 1, wherein the first sensor is a speed sensor for sensing a speed of the motor.

5. The method of claim 1, wherein the second sensor is a current sensor for sensing an electric current of the motor.

6. The method of claim 1, wherein the belt is a seed-transporting belt of a seeding machine.

7. The method of claim 6, wherein at least one of the indicator of torque from the motor and the effective service interval is determined based upon a type of seed being transported by the belt.

8. The method of claim 1, wherein the indicator of belt speed is determined based upon data from the first sensor configured to detect one or more of a reference feature on the belt and an object carried by the belt.

9. The method of claim 8, wherein the first sensor is configured as a seed sensor for detecting movement of seeds being transported by the belt.

10. The method of claim 9, wherein the reference feature is detectable by the seed sensor; and wherein the indicator of belt speed is determined based upon the seed sensor detecting movement of the reference feature.

11. The method of claim 1, further comprising:
    determining an indicator of belt slippage for the first time interval;
    wherein determining the belt service value is further based upon the indicator of belt slippage.

12. The method of claim 1, further comprising:
    providing a belt lifespan notification at a user interface based upon the indicator of the remaining operational lifespan for the belt.

13. A system for monitoring a belt driven by a motor, in order to predict an operational lifespan for the belt, the system comprising:
    one or more sensors configured to detect an indicator of torque from the motor for a first time interval and an indicator of belt speed for the first time interval; and
    a controller configured to:
        determine a belt service value based upon the indicators of belt speed and torque from the motor, the belt service value indicating a deviation from one or more reference belt speeds and torques from the motor;
        determine an effective service interval for the operation of the belt during the first time interval, based upon the belt service value; and
        determine an indicator of a remaining operational lifespan for the belt, based upon the effective service interval.

14. The system of claim 13, wherein the belt service value includes a multiplication factor determined by the controller based upon the indicators of belt speed and torque from the motor; and
    wherein the controller determines the effective service interval based upon multiplying the first time interval by the multiplication factor.

15. The system of claim 14, wherein the controller determines the indicator of the remaining operational lifespan for the belt based upon one of adding the effective service interval to a cumulative service counter and subtracting the effective service interval from a remaining service counter, the cumulative service counter indicating an effective cumulative operating time for the belt and the remaining service counter indicating an effective remaining operating time in the operational lifespan of the belt.

16. The system of claim 13, wherein the one or more sensors include one or more of a speed sensor for the motor and a current sensor for the motor.

17. The system of claim 13, wherein the belt is a seed-transporting belt of a seeding machine and is configured as at least one of a brush belt and a flighted belt.

18. The system of claim 17, wherein the controller is further configured to:
    receive an indicator of a type of seed being transported by the belt; and
    determine at least one of the indicator of torque from the motor and the effective service interval based upon a type of seed being transported by the belt.

19. The system of claim 17, wherein the controller is further configured to control operation of the motor and of a seed meter motor of the seeding machine, and to process data from a seed sensor of the seeding machine.

20. A monitoring system for a seeding machine, the seeding machine configured to move seeds with a seed belt driven by a belt motor, the monitoring system comprising:

a first sensor configured determine an indicator of belt speed for a first time interval;
a second sensor configured to determine an indicator of torque from the belt motor for the first time interval; and
a controller configured to:
  compare the indicators of belt speed and torque from the belt motor to corresponding reference indicators;
  determine a belt service value based upon a deviation of the indicators of belt speed and torque from the belt motor from the reference indicators;
  determine an effective service interval for operation of the belt during the first time interval, based upon multiplying the belt service value by the first time interval; and
  determine an indicator of a remaining operational lifespan for the belt based upon one of adding the effective service interval to a cumulative service counter and subtracting the effective service interval from a remaining service counter, the cumulative service counter indicating an effective cumulative operating time for the belt and the remaining service counter indicating an effective remaining operating time in the operational lifespan of the belt.

* * * * *